US007356408B2

(12) United States Patent
Tsuchiya et al.

(10) Patent No.: US 7,356,408 B2
(45) Date of Patent: Apr. 8, 2008

(54) INFORMATION DISPLAY APPARATUS AND INFORMATION DISPLAY METHOD

(75) Inventors: Hideaki Tsuchiya, Tokyo (JP); Tsutomu Tanzawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 587 days.

(21) Appl. No.: 10/965,126

(22) Filed: Oct. 14, 2004

(65) Prior Publication Data

US 2005/0086000 A1 Apr. 21, 2005

(30) Foreign Application Priority Data

Oct. 17, 2003 (JP) ............................ 2003-357201
Oct. 17, 2003 (JP) ............................ 2003-357205

(51) Int. Cl.
*G08G 1/0969* (2006.01)
*G01C 21/34* (2006.01)

(52) U.S. Cl. ........................ 701/211; 701/96; 701/209; 701/301; 348/142; 340/937

(58) Field of Classification Search ................ 701/211, 701/207, 209, 93, 96, 300, 301; 348/143, 348/148; 340/901, 425.5, 995.24, 439, 937, 340/142, 149; 345/7, 663; 382/181
See application file for complete search history.

(56) References Cited

U.S. PATENT DOCUMENTS

| | | | | |
|---|---|---|---|---|
| 5,949,331 | A | 9/1999 | Schofield et al. | |
| 6,122,597 | A * | 9/2000 | Saneyoshi et al. | 701/301 |
| 6,327,522 | B1 * | 12/2001 | Kojima et al. | 701/1 |
| 6,687,577 | B2 * | 2/2004 | Strumolo | 701/1 |
| 6,774,772 | B2 * | 8/2004 | Hahn | 340/439 |
| 2003/0122930 | A1 * | 7/2003 | Schofield et al. | 348/148 |

FOREIGN PATENT DOCUMENTS

| | | | |
|---|---|---|---|
| EP | 1 300 717 | A2 | 4/2003 |
| JP | 11-250396 | A | 9/1999 |
| JP | 2002-046504 | A | 2/2002 |

* cited by examiner

*Primary Examiner*—Tan Q Nguyen
(74) *Attorney, Agent, or Firm*—Darby & Darby P.C.

(57) ABSTRACT

A recognizing unit recognizes targets located in front of the own vehicle based upon a detection result obtained from a preview sensor, and then, classifies the recognized targets by sorts to which these targets belong. A control unit determines information to be displayed based upon both the targets recognized by the recognizing unit and navigation information. A display device is controlled by the control unit so as to display thereon the determined information. The control unit controls the display device so that symbols indicative of the recognized targets are displayed to be superimposed on the navigation information, and also, controls the display device so that the symbols are displayed by employing a plurality of different display colors corresponding to the sorts to which the respective targets belong.

23 Claims, 7 Drawing Sheets

INFORMATION DISPLAY APPARATUS AND INFORMATION DISPLAY METHOD

This application claims foreign priorities based on Japanese patent application JP 2003-357201, filed on Oct. 17, 2003 and Japanese patent application JP 2003-357205, filed on Oct. 17, 2003, the contents of which are incorporated herein by reference in its entirety.

BACKGROUND OF THE INVENTION

1. Field of the Invention

The present invention is related to an information display apparatus and an information display method. More specifically, the present invention is directed to display both a traveling condition in front of the own vehicle and a navigation information in a superimposing mode.

2. Description of the Related Art

In recent years, specific attentions have been paid to an information display apparatus in which a traveling condition in front of the own vehicle is displayed on a display unit mounted on the own vehicle in combination with a navigation information. For instance, Japanese Laid-open patent Application No. Hei-11-250396 (hereinafter referred as a patent publication 1) discloses a display apparatus for vehicle in which an infrared partial image, corresponding to a region where the own vehicle is traveled, in an infrared image photographed by using an infrared camera, is displayed on a display screen so that the partial infrared image is superimposed on a map image. In accordance with the patent publication 1, since such an infrared partial image, from which an image portion having a low necessity has been cut, is superimposed on the map image, sorts and dimensions of obstructions can be readily recognized, and thus, recognizing characteristics of targets can be improved. On the other hand, Japanese Laid-open patent Application No 2002-46504 (hereinafter referred as a patent publication 2) discloses a cruising control apparatus having an information display apparatus by which positional information as to a peripheral-traveling vehicle and a following vehicle with respect to the own vehicle are superimposed on a road shape produced from a map information, and then, the resulting image is displayed on the display screen. In accordance with the patent publication 2, a mark indicative of the own vehicle position, a mark representative of a position of the following vehicle, and a mark indicative of a position of the peripheral-traveling vehicle other than the following vehicle are displayed so that colors and patterns of these marks are changed with respect to each other and these marks are superimposed on a road image.

However, according to the patent publication 1, the infrared image is merely displayed, and the user recognizes the obstructions from the infrared image which is dynamically changed. Also, according to the patent publication 2, although the own vehicle, the following vehicle, and the peripheral-traveling vehicle are displayed in different display modes, other necessary information than the above-described display information cannot be acquired.

Further, according to the methods disclosed in the patent publication 1 and patent publication 2, there are some possibilities that a color of a target actually located in front of the own vehicle does not correspond to a color of a target displayed on the display apparatus. As a result, a coloration difference between both these colors may possibly give a sense of incongruity to a user. These information display apparatus have been conducted as apparatus designed so as to achieve safety and comfortable drives. User friendly degrees of these apparatus may constitute added values, and thus, may conduct purchasing desires of users. As a consequence, in these sorts of apparatus, higher user friendly functions and unique functions are required.

SUMMARY OF THE INVENTION

An object of the present invention is to provide an information display apparatus and an information display method which displays both a navigation information and a traveling condition in a superimposing mode, and which can provide a improved user friendly characteristic of the information display apparatus.

To solve the above-described problem, an information display apparatus according to a first aspect of the present invention, comprises:

a preview sensor for detecting a traveling condition in front of own vehicle;

a navigation system for outputting a navigation information in response to a traveling operation of the own vehicle;

a recognizing unit for recognizing a plurality of targets located in front of the own vehicle based upon a detection result from the preview sensor, and for classifying the recognized targets by sorts to which the plural targets belong;

a control unit for determining information to be displayed based upon both the targets recognized by the recognizing unit and the navigation information; and a display device for displaying the determined information under control of the control unit, wherein the control unit controls the display device so that both symbols indicative of the recognized targets and the navigation information are displayed in a superimposing manner, and also, controls the display device so that the plural symbols are displayed by employing a plurality of different display colors corresponding to the sorts to which the respective targets belong.

In this case, in the first aspect of the present invention, the recognizing unit preferably classifies the recognized target by at least any one of an automobile, a two-wheeled vehicle, a pedestrian, and an obstruction.

Also, an information display method according to a second aspect of the present invention, comprises:

a first step of recognizing a plurality of targets located in front of own vehicle based upon a detection result obtained by detecting a traveling condition in front of the own vehicle, and classifying the recognized targets by sorts to which the plural targets belong;

a second step of acquiring a navigation information in response to a traveling operation of the own vehicle; and a third step of determining information to be displayed based upon both the targets recognized by the first step and the navigation information acquired by the second step, and displaying the determined information, wherein the third step includes displaying both symbols indicative of the recognized targets and the navigation information in a superimposing manner, and displaying the plural symbols by employing a plurality of different display colors corresponding to the sorts to which the respective targets belong.

In this case, in the second aspect of the present invention, the first step preferably includes classifying the recognized target by at least any one of an automobile, a two-wheeled vehicle, a pedestrian, and an obstruction.

Also, an information display apparatus according to a third aspect of the present invention, comprises:

a preview sensor for detecting a traveling condition in front of own vehicle;

a navigation system for outputting a navigation information in response to a traveling operation of the own vehicle;

a recognizing unit for recognizing a plurality of targets located in front of the own vehicle based upon a detection result from the preview sensor, and for calculating dangerous degrees of the recognized targets with respect to the own vehicle;

a control unit for determining information to be displayed based upon both the targets recognized by the recognizing unit and the navigation information; and a display device for displaying the determined information under control of the control unit, wherein the control unit controls the display device so that both symbols indicative of the recognized targets and the navigation information are displayed in a superimposing manner, and also, controls the display device so that the plural symbols are displayed by employing a plurality of different display colors corresponding to the dangerous degrees.

Furthermore, an information display method according to a fourth aspect of the present invention, comprises:

a first step of recognizing a plurality of targets located in front of own vehicle based upon a detection result obtained by detecting a traveling condition in front of the own vehicle, and calculating dangerous degrees of the recognized targets with respect to the own vehicle;

a second step of acquiring a navigation information in response to a traveling operation of the own vehicle; and a third step of determining information to be displayed based upon both the targets recognized by the first step and the navigation information acquired by the second step, and displaying the determined information, wherein the third step includes displaying both symbols indicative of the recognized targets and the navigation information in a superimposing manner, and displaying the plural symbols by employing a plurality of different display colors corresponding to the dangerous degrees.

In this case, in either the third aspect or the fourth aspect of the present invention, the display colors are preferably set to three, or more different colors in response to the dangerous degrees.

In accordance with the present invention, the targets located in front of the own vehicle may be recognized based upon the detection result from the preview sensor. Then, the symbols indicative of the targets and the navigation information are displayed in the superimposing mode. In this case, the display device is controlled so that the symbols to be displayed are represented in the different display colors in response to the recognized targets. As a consequence, since the differences in the targets can be judged based upon the coloration, the visual recognizable characteristic of the user can be improved. As a result, the user convenient characteristic can be improved.

Further, to solve the above-described problem, an information display apparatus according to a fifth aspect of the present invention, comprises:

a camera for outputting a color image by photographing a scene in front of own vehicle;

a navigation system for outputting a navigation information in response to a traveling operation of the own vehicle;

a recognizing unit for recognizing a target located in front of the own vehicle based upon the outputted color image, and for outputting the color information of the recognized target;

a control unit for determining information to be displayed based upon both the targets recognized by the recognizing unit and the navigation information; and a display device for displaying the determined information under control of the control unit, wherein the control unit controls the display device so that a symbol indicative of the recognized target and the navigation information are displayed in a superimposing manner, and controls the display device so that the symbol is displayed by employing a display color which corresponds to the color information of the target.

In the information display apparatus of the fifth aspect of the present invention, the information display apparatus, preferably further comprises:

a sensor for outputting a distance data which represents a two-dimensional distribution of a distance in front of the own vehicle, wherein the recognizing unit recognizes a position of the target based upon the distance data; and the control unit controls the display device so that the symbol is displayed in correspondence with the position of the target in a real space based upon the position of the target recognized by the recognizing.

Also, in the information display apparatus of the fifth aspect of the present invention, the camera preferably comprise a first camera for outputting the color image by photographing the scene in front of the own vehicle, and a second camera which functions as a stereoscopic camera operated in conjunction with the first camera; and the sensor outputs the distance data by executing a stereoscopic matching operation based upon both the color image outputted from the first camera and the color image outputted from the second camera.

Furthermore, in the information display apparatus of the fifth aspect of the present invention, in the case that the recognizing unit judges such a traveling condition that the outputted color information of the target is different from an actual color of the target, the recognizing unit may specify the color information of the target based upon the color information of the target which has been outputted in the preceding time; and the control unit may control the display device so that the symbol is displayed by employing a display color corresponding to the specified color information.

Also, in the information display apparatus of the fifth aspect of the present invention, the control unit may control the display device so that as to a target, the color information of which is not outputted from the recognizing unit, the symbol indicative of the target is displayed by employing a predetermined display color which has been previously set.

Also, an information display method according to a sixth aspect of the present invention, comprises:

a first step of recognizing a target located in front of own vehicle based upon a color image acquired by photographing a scene in front of the own vehicle, and producing a color information of the recognized target;

a second step of acquiring a navigation information in response to a traveling operation of the own vehicle; and a third step of displaying a symbol indicative of the recognized target and the navigation information in a superimposing manner so that the symbol is displayed by employing a display color corresponding to the produced color information of the target.

In the information display method of the sixth aspect of the present invention, the information display method may further comprise a fourth step of recognizing a position of the target based upon a distance data indicative of a two-dimensional distribution of a distance in front of the own vehicle. In this case, the third step may be displaying the symbol in correspondence with a position of the target in a real space based upon the position of the recognized target.

Also, in the information display method of the sixth aspect of the present invention, preferably, the first step includes a step of, when a judgment is made of such a traveling condition that the produced color information of the target is different from an actual color of the target, specifying a color information of the target based upon the color information of the target which has been outputted in the preceding time; and the third step includes a step of controlling the display device so that the symbol is displayed by employing a display color corresponding to the specified color information.

Further, in the information display method of the sixth aspect of the present invention, preferably, the third step includes a step of controlling the display device so that with respect to a target whose color information is not produced, the symbol indicative of the target is displayed by employing a predetermined display color which has been previously set.

In accordance with the present invention, the target located in front of the own vehicle is recognized based upon the color image acquired by photographing the forward scene of the own vehicle, and also, the color information of this target is outputted. Then, the display device is controlled so that the symbol indicative of this recognized target and the navigation information are displayed in the superimposing mode. In this case, the symbol to be displayed is displayed by employing such a display color corresponding to the outputted color information of the target. As a result, the traveling condition which is actually recognized by the car driver may correspond to the symbols displayed on the display device in the coloration, so that the colorative incongruity feelings occurred between the recognized traveling condition and the displayed symbols can be reduced. As a consequence, since the user visual recognizable characteristic can be improved, the user friendly aspect can be improved.

DETAILED DESCRIPTION OF THE INVENTION

First Embodiment

Figure 1:
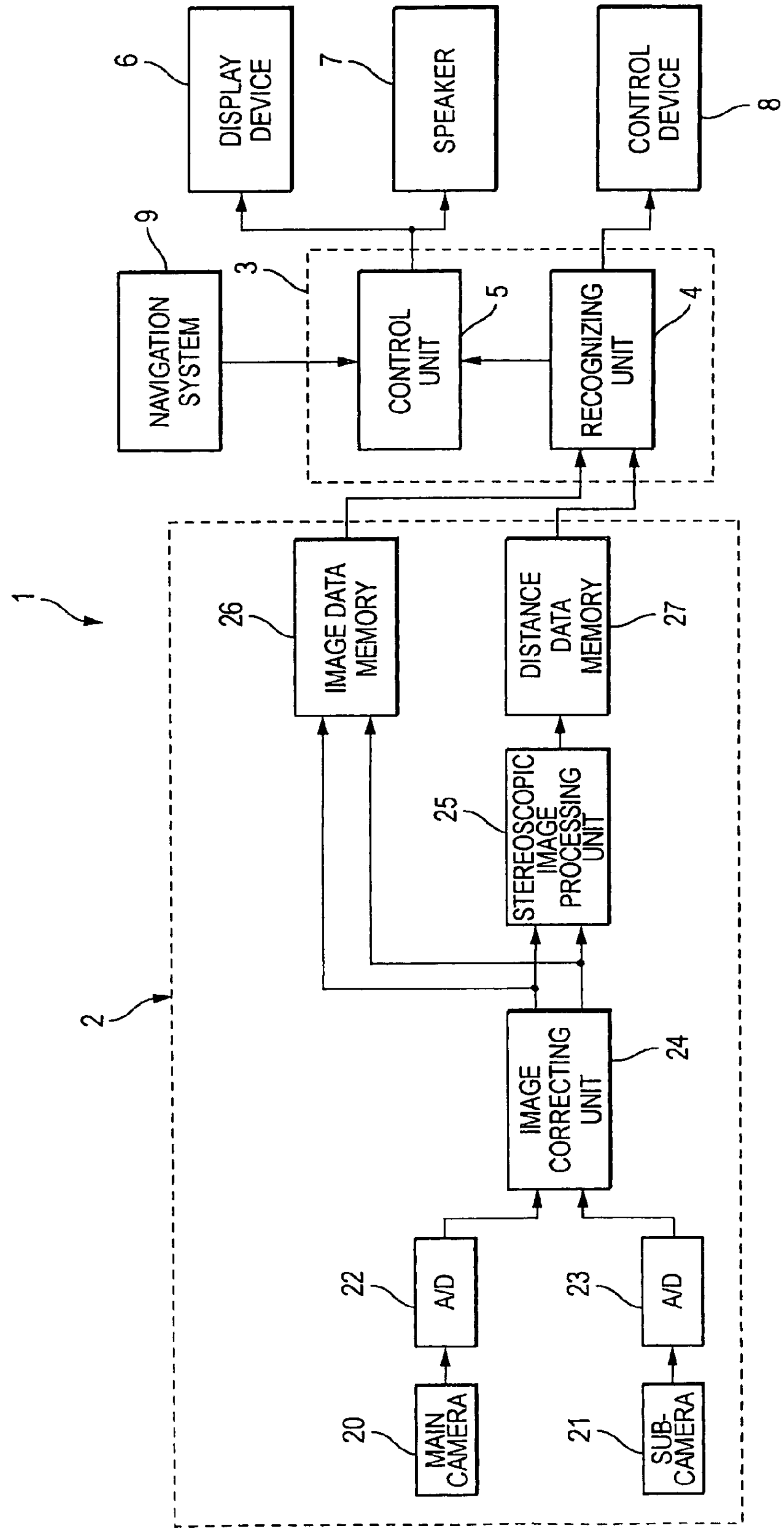
FIG. 1 is a block diagram for showing an entire arrangement of an information display apparatus according to a first embodiment of the present invention.

FIG. 1 is a block diagram for showing an entire arrangement of an information display apparatus 1 according to a first embodiment of the present invention. A preview sensor 2 senses a traveling condition in front of the own vehicle. As the preview sensor 2, a stereoscopic image processing apparatus may be employed. The stereoscopic image processing apparatus is well known in this technical field, and is arranged by a stereoscopic camera and an image processing system.

The stereoscopic camera which photographs a forward scene of the own vehicle is mounted in the vicinity of, for example, a room mirror of the own vehicle. The stereoscopic camera is constituted by one pair of a main camera 20 and a sub-camera 21. An image sensor (for instance, either CCD sensor or CMOS sensor etc.) is built in each of these cameras 20 and 21. The main camera 20 photographs a reference image and the sub-camera 21 photographs a comparison image, which are required so as to perform a stereoscopic image processing. Under such a condition that the operation of the main camera 20 is synchronized with the operation of the sub-camera 21, respective analog images outputted from the main camera 20 and the sub-camera 21 are converted into digital images having a predetermined luminance gradation (for instance, gray scale of 256 gradation values) by A/D converters 22 and 23, respectively.

One pair of digital image data are processed by an image correcting unit 24 so that luminance corrections are performed, geometrical transformations of images are performed, and so on. Under normal condition, since errors may occur as to mounting positions of the one-paired cameras 20 and 21 to some extent, shifts caused by these positional errors are produced in each of reference and composition images. In order to correct this image shift, an affine transformation and the like are used, so that geometrical transformations are carried out, namely, an image is rotated, and is moved in a parallel manner.

After the digital image data have been processed in accordance with such an image processing, a reference image data is obtained from the main camera 20, and a comparison image data is obtained from the sub-camera 21. These reference and comparison image data correspond to a set of luminance values (0 to 255) of respective pixels. In this case, an image plane which is defined by image data is represented by an i-j coordinate system. While a lower left corner of the image is assumed as an origin, a horizontal direction is assumed as an i-coordinate axis whereas a vertical direction is assumed as a j-coordinate axis. Stereoscopic image data equivalent to 1 frame is outputted to a stereoscopic image processing unit 25 provided at a post stage of the image correcting unit 24, and also, is stored in an image data memory 26.

The stereoscopic image processing unit 25 calculates a distance data based upon both the reference image data and the comparison image data, while the distance data is related to a photograph image equivalent to 1 frame. In this connection, the term "distance data" implies set of parallaxes which are calculated every small region in an image plane which is defined by image data, while each of these parallaxes corresponds to a position (i, j) on the image plane. One of the parallaxes is calculated with respect to each pixel block having a predetermined area (for instance, 4×4 pixels) which constitutes a portion of the reference image.

In the case that a parallax related to a certain pixel block (correlated source) is calculated, a region (correlated destination) having a correlation with a luminance characteristic of this pixel block is specified in the comparison image. Distances defined from the cameras 20 and 21 to a target appear as shift amounts along the horizontal direction between the reference image and the comparison image. As a consequence, in such a case that a correlated source is searched in the comparison image, a pixel on the same horizontal line (epipolar line) as a "j" coordinate of a pixel block which constitutes a correlated source may be searched. While the stereoscopic image processing unit 25 shifts pixels on the epipolar line one pixel by one pixel within a predetermined searching range which is set by using the "i" coordinate of the correlated source as a reference, the stereoscopic image processing unit 25 sequentially evaluates a correlation between the correlated source and a candidate of the correlated destination (namely, stereoscopic-matching). Then, in principle, a shift amount of such a correlated destination (any one of candidates of correlated destinations), the correlation of which may be judged as the highest correlation along the horizontal direction, is defined as a parallax of this pixel block. It should be understood that since a hardware structure of the stereoscopic image processing unit 25 is described in Japanese Laid-open patent Application No. Hei-5-114099, this hardware structure may be observed, if necessary. The distance data which has been calculated by executing the above-explained process, namely, a set of parallaxes corresponding to the position (i, j) on the image is stored in a distance data memory 27.

A microcomputer 3 is constituted by a CPU, a ROM, a RAM, an input/output interface, and the like. When functions of the microcomputer 3 are grasped, this microcomputer 3 contains both a recognizing unit 4 and a control unit 5. The recognizing unit 4 recognizes targets located in front of the own vehicle based upon a detection result from the preview sensor 2, and also, classifies the recognized targets based upon sorts to which the targets belong. Targets which should be recognized by the recognizing unit 4 are typically three-dimensional objects. In the first embodiment, these targets correspond to 4 sorts of such three-dimensional objects as an automobile, a two-wheeled vehicle, a pedestrian, and an obstruction (for example, falling object on road, pylon used in road construction, tree planted on road side, etc.). The control unit 5 determines information which should be displayed with respect to the display device 6 based upon the targets recognized by the recognizing unit 4 and the navigation information. Then, the control unit 5 controls the display device 6 so as to display symbols indicative of the recognized targets and the navigation information in a superimposing mode. To this end, the symbols indicative of the targets (in this embodiment, automobile, two-wheeled vehicle, pedestrian, and obstruction) have been stored in the ROM of the microcomputer 3 in the form of data having predetermined formats (for instance, image and wire frame model). Then, the symbols indicative of these targets are displayed by employing a plurality of different display colors which correspond to the sorts to which the respective targets belong. Also, in the case that the recognizing unit 4 judges that a warning is required for a car driver based upon the recognition result of the targets, the recognizing unit 4 operates the display device 6 and the speaker 7, so that the recognizing unit 4 may cause the car driver to pay his attention. Further, the recognizing unit 4 may control the control device 8 so as to perform such a vehicle control operation as a shift down control, a braking control and so on.

In this case, a navigation information is such an information which is required to display a present position of the own vehicle and a scheduled route of the own vehicle in combination with map information. The navigation information can be acquired from a navigation system 9 which is well known in this technical field. Although this navigation system 9 is not clearly illustrated in FIG. 1, the navigation system 9 is mainly arranged by a vehicle speed sensor, a gyroscope, a GPS receiver, a map data input unit, and a navigation control unit. The vehicle speed sensor corresponds to a sensor for sensing a speed of a vehicle. The gyroscope detects an azimuth angle change amount of the vehicle based upon an angular velocity of rotation motion applied to the vehicle. The GPS receiver receives electromagnetic waves via an antenna, which are transmitted from GPS-purpose satellites, and then, detects a positioning information such as a position, azimuth (traveling direction), and the like of the vehicle. The map data input unit corresponds to an apparatus which enters data as to a map information (will be referred to as "map data" hereinafter) into the navigation system 9. The map data has been stored in a recording medium which is generally known as a CD-ROM and a DVD. The navigation control unit calculates a present position of the vehicle based upon either the positioning information acquired from the GPS receiver or both a travel distance of the vehicle in response to a vehicle speed and an azimuth change amount of the vehicle. Both the present position calculated by the navigation control unit and map data corresponding to this present position are outputted as navigation information with respect to the control unit 5.

Figure 2:
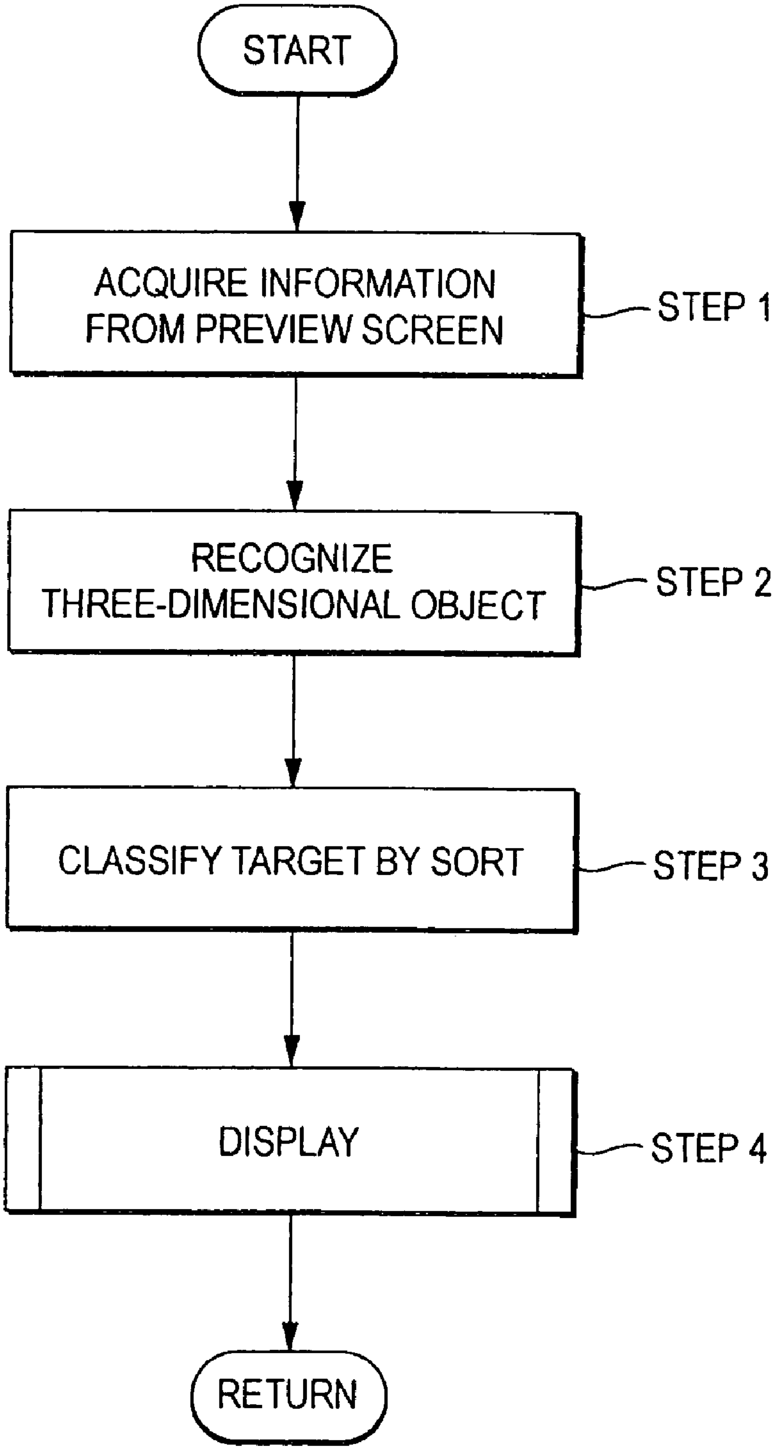
FIG. 2 is a flow chart for showing a sequence of an information display process according to the first embodiment.

FIG. 2 is a flow chart for describing a sequence of an information display process according to the first embodiment. A routine indicated in this flowchart is called every time a preselected time interval has passed, and then, the called routine is executed by the microcomputer 3. In a step 1, a detection result obtained in the preview sensor 2, namely information required so as to recognize a traveling condition in front of the own vehicle (namely, forward traveling condition) is acquired. In the stereoscopic image processing apparatus functioning as the preview sensor 2, in the step 1, the distance data which has been stored in the distance data memory 27 is read. Also, the image data which has been stored in the image data memory 26 is read, if necessary.

In a step 2, three-dimensional objects are recognized which are located in front of the own vehicle. When the three-dimensional objects are recognized, first of all, noise contained in the distance data is removed by a group filtering process. In other words, parallaxes which may be considered as low reliability are removed. A parallax which is caused by mismatching effects due to adverse influences such as noise is largely different from a value of a peripheral parallax, and owns such a characteristic that an area of a group having a value equivalent to this parallax becomes relatively small. As a consequence, as to parallaxes which are calculated as to the respective pixel blocks, change amounts with respect to parallaxes in pixel blocks which are located adjacent to each other along upper/lower directions, and right/left directions, which are present within a predetermined threshold value, are grouped. Then, dimension of areas of groups are detected, and such a group having a larger area than a predetermined dimension (for example, 2 pixel blocks) is judged as an effective group. On the other hand, distance data (isolated distance data) belonging to such a group having an area smaller than, or equal to the predetermined dimension is removed from the distance data, since it is so judged that reliability of the calculated parallax is low.

Next, based upon both the parallax extracted by the group filtering process and the coordinate position on the image plane, which corresponds to this extracted parallax, a position on a real space is calculated by employing the coordinate transforming formula which is well known in this field. Then, since the calculated position on the real space is compared with the position of the road plane, such a parallax located above the road plane is extracted. In other words, a parallax equivalent to a three-dimensional object (will be referred to as "three-dimensional object parallax" hereinafter) is extracted. A position on the road surface may be specified by calculating a road model which defines a road shape. The road model is expressed by linear equations both in the horizontal direction and the vertical direction in the coordinate system of the real space, and is calculated by setting a parameter of this linear equation to such a value which is made coincident with the actual road shape. The recognizing unit 5 refers to the image data based upon such an acquired knowledge that a white lane line drawn on a road surface owns a high luminance value as compared with that of the road surface. Positions of right-sided white lane line and left-sided white lane line may be specified by evaluating a luminance change along a width direction of the road based upon this image data. Then, a position of a white lane line on the real space is detected by employing distance data based upon the position of this white lane line on the image plane. The road model is calculated so that the white lane lines on the road are subdivided into a plurality of sections along the distance direction, the right-sided white lane line and the left-sided white lane line in each of the sub-divided sections are approximated by three-dimensional straight lines, and then, these three-dimensional straight lines are coupled to each other in a folded line shape.

Next, the distance data is segmented in a lattice shape, and a histogram related to three-dimensional object parallaxes belonging to each of these sections is formed every section of this lattice shape. This histogram represents a distribution of frequencies of the three-dimensional parallaxes contained per unit section.

In this histogram, a frequency of a parallax indicative of a certain three-dimensional object becomes high. As a result, in the formed histogram, since such a three-dimensional object parallax whose frequency becomes larger than, or equal to a judgment value is detected, this detected three-dimensional object parallel is detected as a candidate of such a three-dimensional object which is located in front of the own vehicle. In this case, a distance defined up to the candidate of the three-dimensional object is also calculated. Next, in the adjoining sections, candidates of three-dimensional objects, the calculated distances of which are in proximity to each other, are grouped, and then, each of these groups is recognized as a three-dimensional object. As to the recognized three-dimensional object, positions of right/left edge portions, a central position, a distance, and the like are defined as parameters in correspondence therewith. It should be noted that the concrete processing sequence in the group filter and the concrete processing sequence of the three-dimensional object recognition are disclosed in Japanese Laid-open patent Application No. Hei-10-285582, which may be taken into account, if necessary.

In a step 3, the recognized three-dimensional object is classified based upon a sort to which this three-dimensional object belongs. The recognized three-dimensional object is classified based upon, for example, conditions indicated in the below-mentioned items (1) to (3):

(1) whether or not a width of the recognized three-dimensional object along a lateral direction is smaller than, or equal to a judgment value.

Among the recognized three-dimensional objects, since a width of an automobile along the width direction thereof is wider than each of widths of other three-dimensional objects (two-wheeled vehicle, pedestrian, and obstruction), the automobile may be separated from other three-dimensional objects, while the lateral width of the three-dimensional object is employed as a judgment reference. As a result, since a properly set judgment value (for example, 1 meter) is employed, a sort of such a three-dimensional object whose lateral width is larger than the judgment value may be classified as the automobile.

(2) Whether or not a velocity "V" of a three-dimensional object is lower than, or equal to a judgment value.

Among three-dimensional objects except for an automobile, since a velocity "V" of a two-wheeled vehicle is higher than velocities of other three-dimensional objects (pedestrian and objection), the two-wheeled vehicle may be separated from other three-dimensional objects, while the velocity "V" of the three-dimensional object is used as a judgment reference. As a consequence, since a properly set judgment value (for instance, 10 km/h) is employed, a sort of such a three-dimensional object whose velocity "V" is higher than the judgment value may be classified as the two-wheeled vehicle. It should also be understood that a velocity "V" of a three-dimension object may be calculated based upon both a relative velocity "Vr" and a present velocity "V0" of the own vehicle, while this relative velocity "Vr" is calculated in accordance with a present position of this three-dimensional object and a position of this three-dimensional object before predetermined time has passed.

(3) Whether or not a velocity "V" is equal to 0.

Among three-dimensional objects except for both an automobile and a two-wheeled object, since a velocity "V" of an obstruction is equal to 0, the obstruction may be separated from a pedestrian, while the velocity V of the three-dimensional object is employed as a judgment reference. As a consequence, a sort of such a three-dimensional object whose velocity becomes equal to 0 may be classified by the obstruction.

Other than these three conditions, since heights of three-dimensional objects are compared with each other, a pedestrian may be alternatively separated from an automobile. Furthermore, such a three-dimensional object, the position of which in the real space is located at the outer side than the position of the white lane line (road model), may be alternatively classified by a pedestrian. Also, such a three-dimensional object which is moved along the lateral direction may be alternatively classified by a pedestrian who walks across a road.

Figure 3A:
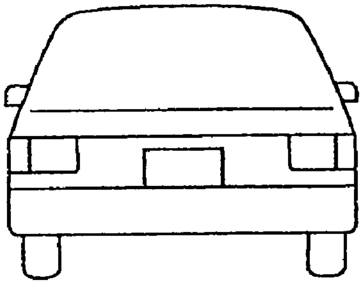
FIGS. 3A-3D are schematic diagrams for showing examples of display symbols.
Figure 3B:
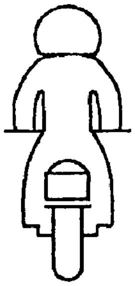
Figure 3C:
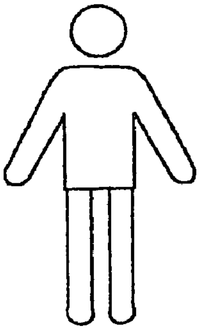
Figure 3D:
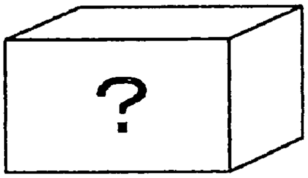

In a step 4, a display process is carried out based upon the navigation information and the recognized three-dimensional object. First, the control unit 5 determines a symbol based upon the sort to which the recognized three-dimensional object belongs, while the symbol is used so as to display this three-dimensional object on the display device 6. FIGS. 3A-3D are schematic diagrams for showing examples of symbols. In this drawing, symbols used to display three-dimensional objects belonging to the respective sorts are represented, and each of these symbols is made of a design for designing the relevant sort. In the drawing, FIG. 3A shows a symbol used to display a three-dimensional object, the sort of which is classified by an "automobile"; FIG. 3B shows a symbol used to display a three-dimensional object, the sort of which is classified by a "two-wheeled vehicle." Also, FIG. 3C shows a symbol used to display a three-dimensional object, the sort of which is classified by a "pedestrian"; and FIG. 3D shows a symbol used to display a three-dimensional object, the sort of which is classified by an "obstruction."

For instance, in such a case that a sort of the three-dimensional object is classified by a "two-wheeled vehicle", the control apparatus 5 controls the display device 6 so that the symbol indicated in FIG. 3B is displayed as the symbol indicative of this three-dimensional object. It should be understood that in such a case that two, or more pieces of three-dimensional objects which have been classified by the same sorts are recognized, or in the case that two, or more pieces of three-dimensional objects which have been classified by the different sorts from each other are recognized, the control unit 5 controls the display device 6 so that the symbols corresponding to the sorts of the respective recognized three-dimensional objects are represented.

Then, the control unit 5 controls the display device 6 so as to realize display modes described in the below-mentioned items (1) and (2):

(1) Both the symbol and the navigation information are displayed in a superimposing mode.

In a three-dimensional object recognizing operation using the preview sensor 2, a position of the three-dimensional object is represented by a coordinate system (in this first embodiment, three-dimensional coordinate system) in which the position of the own vehicle is set to a position of an origin thereof. Under such a circumstance, while the present position of the own vehicle acquired from the navigation system 9 is employed as a reference position, the control unit 5 superimposes symbols corresponding to the respective three-dimensional objects on the map data by considering the positions of the respective three-dimensional objects. In this case, while the control unit 5 refers to a road model, the control unit 5 defines a road position on the road data in correspondence with the positions of the three-dimensional objects by setting the road model, so that the symbols can be displayed on more correct positions.

(2) Symbols are displayed in predetermined display colors.

As to symbols displayed on map data, display colors have been previously set in correspondence with sorts to which three-dimensional objects belong. In the first embodiment, in view of such a point that weaklings in a traffic environment must be protected, a red display color which becomes conspicuous in a color sense has been previously set to such a symbol indicative of a pedestrian to which the highest attention should be paid, and a yellow display color has been previously set to such a symbol indicative of a two-wheeled vehicle to which the second highest attention should be paid. Also, a blue display color has been previously set to a symbol representative of an automobile, and a green display color has been previously set to a symbol representative of an obstruction. As a result, when a symbol is displayed, the control unit 5 controls the display device 6 so that this symbol is displayed by such a display color in correspondence with a sort to which a three-dimensional object belongs.

Figure 4:
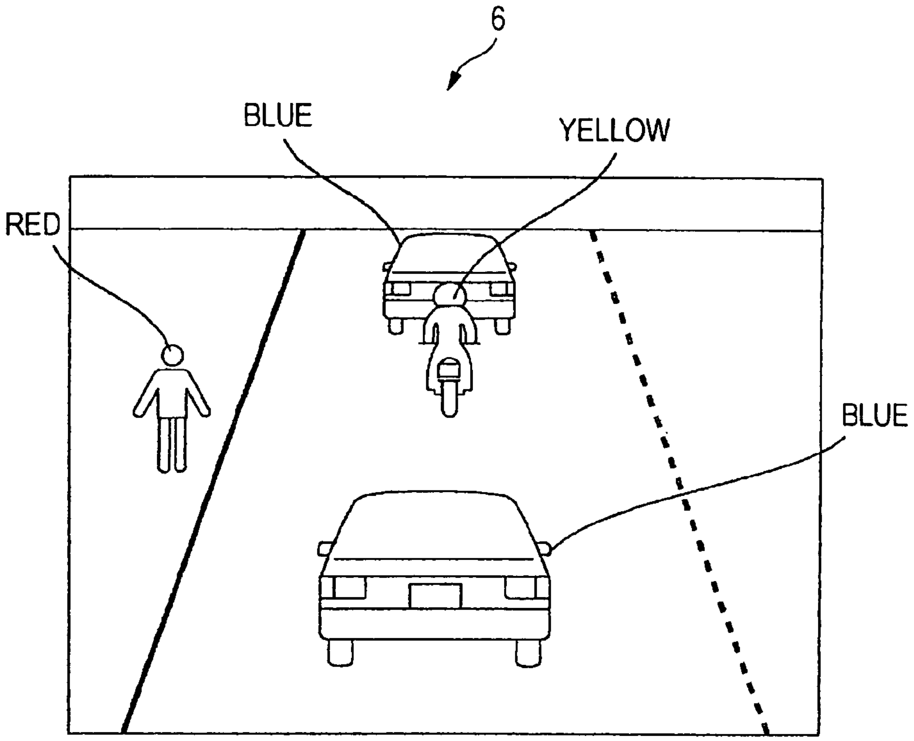
FIG. 4 is an explanatory diagram for showing a display condition of the display apparatus.

FIG. 4 is an explanatory diagram for showing a display condition of the display device 6. In this drawing, in such a case that two automobiles are recognized, one two-wheeled vehicle is recognized, and only one pedestrian is recognized, the map data is displayed by employing a so-called "driver's eye" manner, and symbols indicative of the respective three-dimensional objects are displayed in such a case that these symbols are superimposed on this map data. As previously explained, while the display colors have been previously set to the symbols displayed on the display device 6, only symbols indicative of the three-dimensional objects which are classified by the same sorts are displayed in the same display colors.

Alternatively, as illustrated in this drawing, it should be understood that the control unit 5 may control the display device 6 in order that the symbols are represented by the perspective feelings other than the above-described conditions (1) and (2). In this alternative case, the further a three-dimensional object is located far from the own vehicle, the smaller a display size of a symbol thereof is decreased in response to a distance from the recognized three-dimensional object symbol to the own vehicle. Also, in such a case that a symbol which is displayed at a positionally far position is overlapped with another symbol which is displayed at a position closer than the above-described far position with respect to the own vehicle, the control unit 6 may alternatively control the display device 6 so that the former symbol is displayed on the side of the upper plane, as compared with the latter symbol. As a consequence, since the far-located symbol is covered to be masked by the near-located symbol, the visual recognizable characteristic of the symbols may be improved, and furthermore, the positional front/rear relationship between these symbols may be represented.

As previously explained, in accordance with the first embodiment, a target (in the first embodiment, three-dimensional object) which is located in front of the own vehicle is recognized based upon the detection result obtained from the preview sensor 2. Also, the recognized target is classified by a sort to which this three-dimensional object belongs based upon the detection result obtained from the preview sensor 2. Then, a symbol indicative of the recognized target and navigation information are displayed in the superimposing mode. In this case, the display device 6 is controlled so that the symbol to be displayed becomes such a display color corresponding to the classified sort. As a result, since the difference in the sorts of the targets can be recognized by way of the coloration, the visual recognizable characteristic by the user (typically, car driver) can be improved. Also, since the display colors are separately utilized in response to the degrees for conducting the attentions, the orders of the three-dimensional objets to which the car driver should pay his attention can be grasped from the coloration by way of the experimental manner. As a result, since the user convenient characteristic can be improved by the functions which are not realized in the prior art, the product attractive force can be improved in view of the user friendly aspect.

It should also be understood that when the symbols corresponding to all of the recognized three-dimensional objects are displayed, there is such a merit that the traveling condition is displayed in detail. However, the amount of information displayed on the screen is increased. In other words, such an information as a preceding-traveled vehicle which is located far from the own vehicle is also displayed which has no direct relationship with the driving operation. In view of such an idea for eliminating unnecessary information, a plurality of three-dimensional objects which are located close to the own vehicle may be alternatively selected, and then, only symbols corresponding to these selected three-dimensional objects may be alternatively displayed. It should also be noted that a selecting method may be alternatively determined so that a pedestrian which must be protected at the highest safety degree is selected in a top priority. Also, in the first embodiment, the three-dimensional objects have been classified by the four sorts. Alternatively, these three-dimensional objects maybe classified by more precise sorts within a range which can be recognized by the preview sensor 2.

Second Embodiment

A different point as to an information display processing operation according to a second embodiment of the present invention from that of the first embodiment is given as follows: That is, display colors of symbols are set in response to dangerous degrees (concretely speaking, collision possibility) of recognized three-dimensional objects with respect to the own vehicle. As a result, in the second embodiment, as to the recognized three-dimensional objects, dangerous grades "T" indicative of dangerous degrees with respect to the own vehicle are furthermore calculated by the recognizing unit 4. Then, the respective symbols representative of the recognized three-dimensional objects are displayed by employing a plurality of different display colors corresponding to the dangerous grades T of the three-dimensional objects.

Concretely speaking, first of all, similar to the process shown in steps 1 to 3 in FIG. 2, based upon a detection result obtained from the preview sensor 2, three-dimensional objects located in front of the own vehicle are recognized, and further, these recognized three-dimensional objects are classified by sorts to which these three-dimensional objects belong. Then, in this second embodiment, after the step 3, while the respective recognized three-dimensional objects (targets) are handled as calculation objects, dangerous grades "T" of the respective recognized three-dimensional objects are calculated. This dangerous grade "T" may be calculated in a principal manner by employing, for example, the below-mentioned formula 1:

$$T=K1\times D+K2\times Vr+K3\times Ar \qquad \text{(Formula 1)}$$

In this formula 1, symbol "D" shows a distance (m) measured up to a target; symbol "Vr" indicates a relative velocity between the own vehicle and the target; and symbol "Ar" represents a relative acceleration between the own vehicle and the target. Also, parameters "K1" to "K3" correspond to coefficients related to the respective variables "D", "Vr", "Ar." It should be understood that these parameter K1 to K3 have been set to proper values by previously executing an experiment and a simulation. For instance, the formula 1 (dangerous grade T) to which these coefficients K1 to K3 have been set indicates temporal spare until the own vehicle reaches a three-dimensional object. In the second embodiment, the formula 1 implies that the larger a dangerous grade T of a target becomes, the lower a dangerous degree of this target becomes (collision possibility is low), whereas the smaller a dangerous grade T of a target becomes, the higher a dangerous degree of this target becomes (collision possibility is high).

Then, similar to the process indicated in the step 4 of FIG. 2, a display process is carried out based upon the navigation information and the three-dimensional objects recognized by the recognizing unit 4. Concretely speaking, symbols to be displayed are firstly determined based upon sorts to which these recognized three-dimensional objects belong. The control unit 8 controls the display device 6 to display the symbols and the navigation information in a superimposing manner. In this case, the display colors of the symbols to be displayed have been previously set in correspondence with the dangerous grades "T" which are calculated with respect to the corresponding three-dimensional objects. Concretely speaking, as to a target (dangerous grade T≦first judgment value), the dangerous grade T of which becomes smaller than, or equal to the first judgment value, namely, the three-dimensional object whose dangerous degree is high, a display color of this symbol has been set to a red color which becomes conspicuous in a color sense. Also, as to another target (first judgment value<dangerous grade T≦second judgment value), the dangerous grade T of which is larger than the first judgment value and also is smaller than, or equal to a second judgment value larger than this first judgment value, namely, the three-dimensional object whose dangerous degree is relative high, a display color of this symbol has been set to a yellow color. Then, a further object (second judgment value<dangerous grade T), the dangerous grade T of which is larger than the second judgment value, namely, the three-dimensional object whose dangerous degree is low, a display color of this symbol has been set to a blue color.

Figure 5:
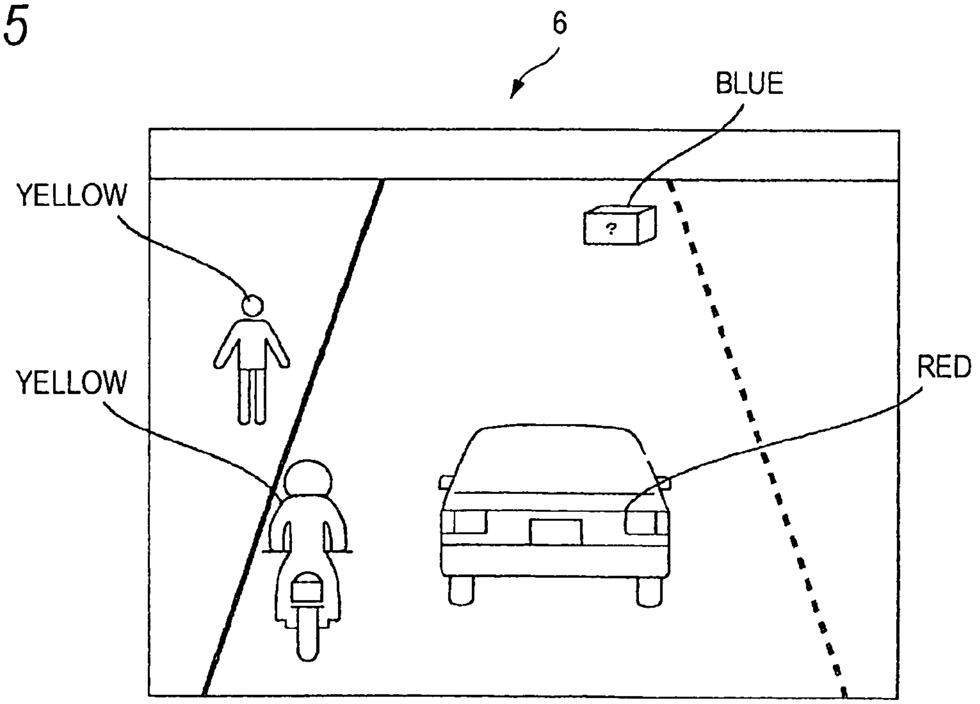
FIG. 5 is an explanatory diagram for showing another display condition of the display apparatus.

FIG. 5 is an explanatory diagram for showing a display mode of the display device 6. This drawing exemplifies such a display mode in the case that a forward traveling vehicle suddenly brakes wheels. As shown in this drawing, since the display colors are separately used in correspondence with the dangerous grades "T", a symbol representing the forward traveling vehicle is displayed in a red color, the dangerous degree of which is high (namely, collision possibility is high) with respect to the own vehicle. Then, a symbol indicative of a three-dimensional object, the dangerous degree of which is low (namely, collision possibility is low) with respect to the own vehicle, is displayed in either a yellow display color or a blue display color.

As previously described, in accordance with the second embodiment, both the symbols indicative of the recognized targets and the navigation information are displayed in the superimposing mode, and the display apparatus is controlled so that these symbols are represented by the display colors in response to the dangerous degrees with respect to the own vehicle. As a result, since the difference in the dangerous degrees of the targets with respect to the own vehicle by way of the coloration, the visual recognizable characteristic by the car driver can be improved. Also, since the display colors are separately utilized in response to the degrees for conducting the car driver's attentions, the orders of the three-dimensional objects to which the car driver should pay his attention can be grasped from the coloration by way of the experimental manner. As a result, since the user convenient characteristic can be improved by the functions which are not realized in the prior art, the product attractive force can be improved in view of the user friendly aspect.

It should also be noted that although the symbols are displayed by employing the three display colors in response to the dangerous grades "T" in this second embodiment, these symbols may be alternatively displayed in a larger number of display colors than the three display colors. In this alternative case, the dangerous degrees may be recognized in a more precise range with respect to the car driver.

Also, the stereoscopic image processing apparatus has been employed as the preview sensor 25 in both the first and second embodiments. Alternatively, other distance detecting sensors such as a single-eye camera, a laser radar, and a millimeter wave radar, which are well known in the technical field, may be employed in a sole mode, or a combination mode. Even when the above-described alternative distance detecting sensor is employed, a similar effect to that of the above-explained embodiments may be achieved.

Also, in the first and second embodiments, such symbols have been employed, the designs of which have been previously determined in response to the sorts of these three-dimensional objects. Alternatively, one sort of symbol may be displayed irrespective of the sorts of the three-dimensional objects. Also, based upon image data photographed by a stereoscopic camera, such an image corresponding to the recognized three-dimensional object may be displayed. Even in these alternative cases, since the display colors are made different from each other, the same sort of three-dimensional objects (otherwise, dangerous degree of three-dimensional objects) may be recognized based upon the coloration. Furthermore, the present invention may be applied not only to the display manner such as the driver's eye display manner, but also a bird's eye view display manner (for example, bird view) and a plan view display manner.

Third Embodiment

Figure 6:
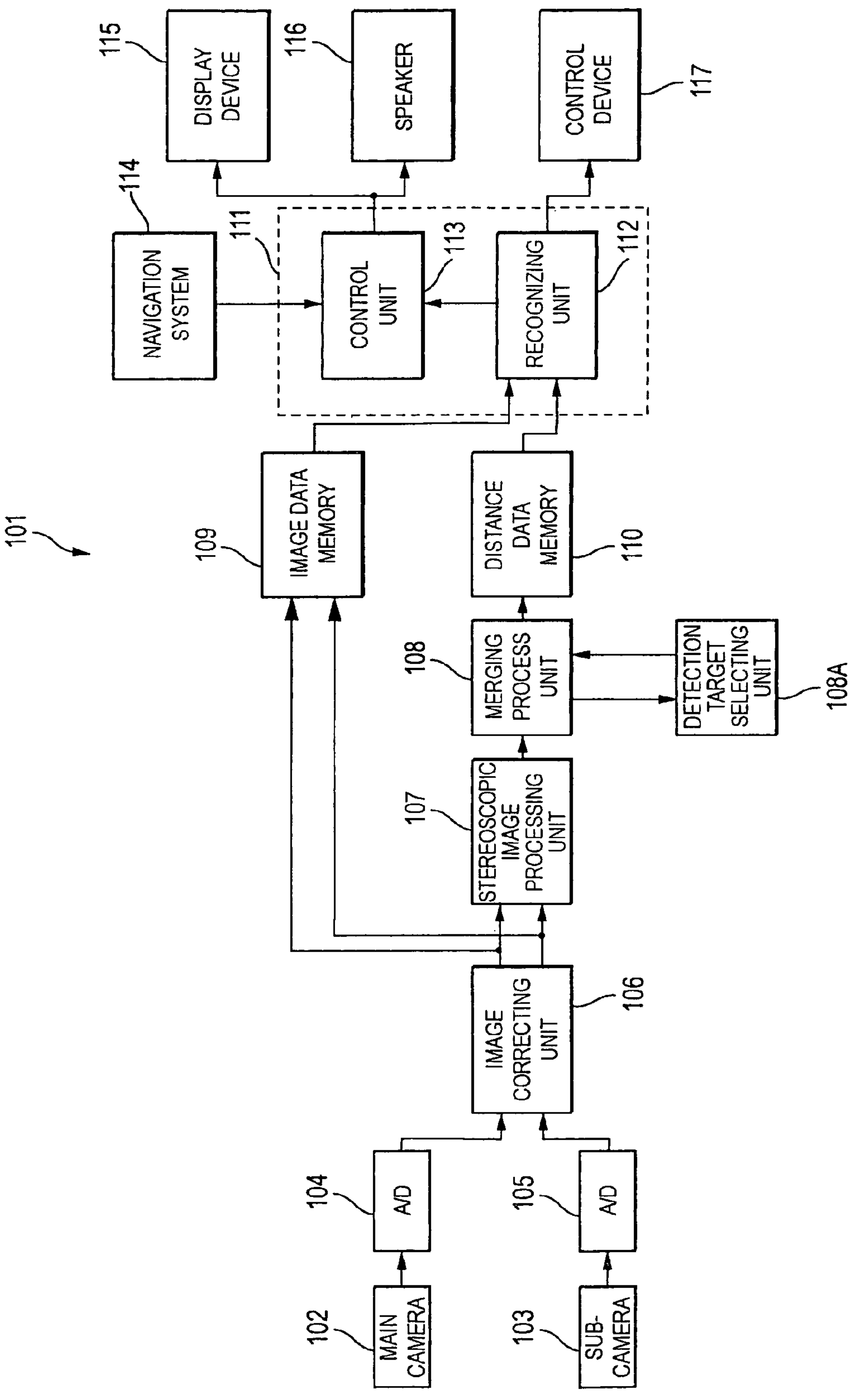
FIG. 6 is a block diagram for showing an entire arrangement of an information display apparatus according to a third embodiment of the present invention.

FIG. 6 is a block diagram for representing an entire arrangement of an information display apparatus 101 according to a third embodiment of the present invention. A stereoscopic camera which photographs a forward scene of the own vehicle is mounted in the vicinity of, for example, a room mirror of the own vehicle. The stereoscopic camera is constituted by one pair of a main camera 102 and a sub-camera 103. The main camera 102 photographs a reference image and the sub-camera 103 photographs a comparison image, which are required so as to perform a stereoscopic image processing. While separately operable image sensors (for example, 3-plate type color CCD) of red, green, blue colors are built in each of the cameras 102 and 103, three primary color images of a red image, a green image, a blue image are outputted from each of the main camera 102 and the sub-camera 103. As a result, color images outputted from one pair of the cameras 102 and 103 are 6 sheets of color images in total. Under such a condition that the operation of the main camera 102 is synchronized with the operation of the sub-camera 103, respective analog images outputted from the main camera 102 and the sub-camera 103 are converted into digital images having predetermined luminance gradation (for instance, gray scale of 256 gradation values) by A/D converters 104 and 105, respectively.

One pair of digitally-processed primary color images (6 primary color images in total) are processed by an image correcting unit 106 so that luminance corrections are performed, geometrical transformations of images are performed, and so on. Under normal condition, since errors may occur as to mounting positions of the one-paired cameras 102 and 103 to some extent, shifts caused by these positional errors are produced in a right image and a left image. In order to this image shift, an affine transformation and the like are used, so that geometrical transformations are carried out, namely, an image is rotated, and is moved in a parallel manner.

After the digital image data have been processed in accordance with such an image processing, a reference image data corresponding to the three primary color images is obtained from the main camera 102, and a comparison image data corresponding to the three primary color images is obtained from the sub-camera 103. These reference image data and comparison image data correspond to a set of luminance values (0 to 255) of respective pixels. In this case, an image plane which is defined by image data is represented by an i-j coordinate system. While a lower left corner of this image is assumed as an origin, a horizontal direction is assumed as an i-coordinate axis whereas a vertical direction is assumed as a j-coordinate axis. Both reference image data and comparison image data equivalent to 1 frame are outputted to a stereoscopic image processing unit 107 provided at a post stage of the image correcting unit 106, and also, are stored in an image data memory 109.

The stereoscopic image processing unit 107 calculates a distance data based upon both the reference image data and the comparison image data, while the distance data is related to a photograph image equivalent to 1 frame. In this connection, the term "distance data" implies set of parallaxes which are calculated every small region in an image plane which is defined by image data, while each of these parallaxes corresponds to a position (i, j) on the image plane. One of the parallaxes is calculated with respect to each pixel block having a predetermined area (for instance, 4×4 pixels) which constitutes a portion of the reference image. In the third embodiment in which the three primary color images are outputted from each of the cameras 102 and 103, this stereoscopic matching operation is separately carried out every the same primary color image.

In the case that a parallax related to a certain pixel block (correlated source) is calculated, a region (correlated destination) having a correlation with a luminance characteristic of this pixel block is specified in the comparison image. Distances defined from the cameras 102 and 103 to a target appear as shift amounts along the horizontal direction between the reference image and the comparison image. As a consequence, in such a case that a correlated source is searched in the comparison image, a pixel on the same horizontal line (epipolar line) as a "j" coordinate of a pixel block which constitutes a correlated source may be searched. While the stereoscopic image processing unit 125 shifts pixels on the epipolar line one pixel by one pixel within a predetermined searching range which is set by using the "i" coordinate of the correlated source as a reference, the stereoscopic image processing unit 125 sequentially evaluates a correlation between the correlated source and a candidate of the correlated destination (namely, stereoscopic-matching). Then, in principle, a shift amount of such a correlated destination (any one of candidates of correlated destinations), the correlation of which maybe judged as the highest correlation along the horizontal direction is defined as a parallax of this pixel block. In other words, distance data corresponds to a two-dimensional distribution of a distance in front of the own vehicle. Then, the stereoscopic image processing unit 107 performs a stereoscopic matching operation between the same primary color images, and then, outputs the stereoscopically matched primary color image data to a merging process unit 108 provided at a post stage of this stereoscopic image processing unit 107. As a result, with respect to one pixel block in the reference image, three parallaxes (will be solely referred to as "primary color parallax" hereinafter) are calculated.

The merging process unit 108 merges three primary color parallaxes which have been calculated as to a certain pixel block so as to calculate a unified parallax "Ni" related to this certain pixel block. In order to merge the primary color parallaxes, multiply/summation calculations are carried out based upon parameters (concretely speaking, weight coefficients of respective colors) which are obtained from a detection subject selecting unit 108*a*. A set of the parallaxes "Ni" which have been acquired in the above-described manner and are equivalent to 1 frame is stored as distance data into a distance data memory 110. It should also be noted that since both detailed system structures and detailed system process operations of both the merging process unit 8 and the detection subject selecting unit 8*a* are described in Japanese Patent Application No. 2001-343801 which has already been filed the Applicant, contents thereof may be read, if necessary.

A microcomputer 111 is constituted by a CPU, a ROM, a RAM, an input/output interface, and the like. When functions of the microcomputer 111 are grasped, this microcomputer 111 contains both a recognizing unit 112 and a control unit 113. The recognizing unit 112 recognizes targets located in front of the own vehicle based upon the primary color image data stored in the image data memory 109, and also, produces color information of the recognized targets. Targets which should be recognized by the recognizing unit 112 are typically three-dimensional objects. In the third embodiment, these targets correspond to an automobile, a two-wheeled vehicle, a pedestrian, and so on. Both the information of the targets recognized by the recognizing unit 112 and the color information produced by the recognizing unit 112 are outputted with respect to the control unit 113. The control unit 113 controls a display device 115 provided at a post stage of the control unit 113 so that symbols indicative of the targets recognized by the recognizing unit 112 are displayed by being superimposed on the navigation information. In this case, the symbols corresponding to the targets are displayed by using display colors which correspond to the color information of the outputted targets.

In this case, a navigation information is such an information which is required to display a present position of the own vehicle and a scheduled route of the own vehicle in combination with map information on the display device 115, and the navigation information can be acquired from a navigation system 114 which is well known in this technical field. Although this navigation system 114 is not clearly illustrated in FIG. 6, the navigation system 114 is mainly arranged by a vehicle speed sensor, a gyroscope, a GPS receiver, a map data input unit, and a navigation control unit. The vehicle speed sensor corresponds to a sensor for sensing a speed of a vehicle. The gyroscope detects an azimuth angle change amount of the vehicle based upon an angular velocity of rotation motion applied to the vehicle. The GPS receiver receives electromagnetic waves via an antenna, which are transmitted from GPS-purpose satellites, and then, detects positioning information such as a position, azimuth (traveling direction), and the like of the vehicle. The map data input unit corresponds to such an apparatus which enters data as to map information (will be referred to as "map data" hereinafter) into the navigation system 114. This map data has been stored in a recording medium which is generally known as a CD-ROM and a DVD. The navigation control unit calculates a present position of the vehicle based upon either positioning information acquired from the GPS receiver or both a travel distance of the vehicle in response to a vehicle speed and an azimuth change amount of the vehicle. Both the present position calculated by the navigation control unit and map data corresponding to this present position are outputted as navigation information from the navigation system 114 to the microcomputer 111.

Figure 7:
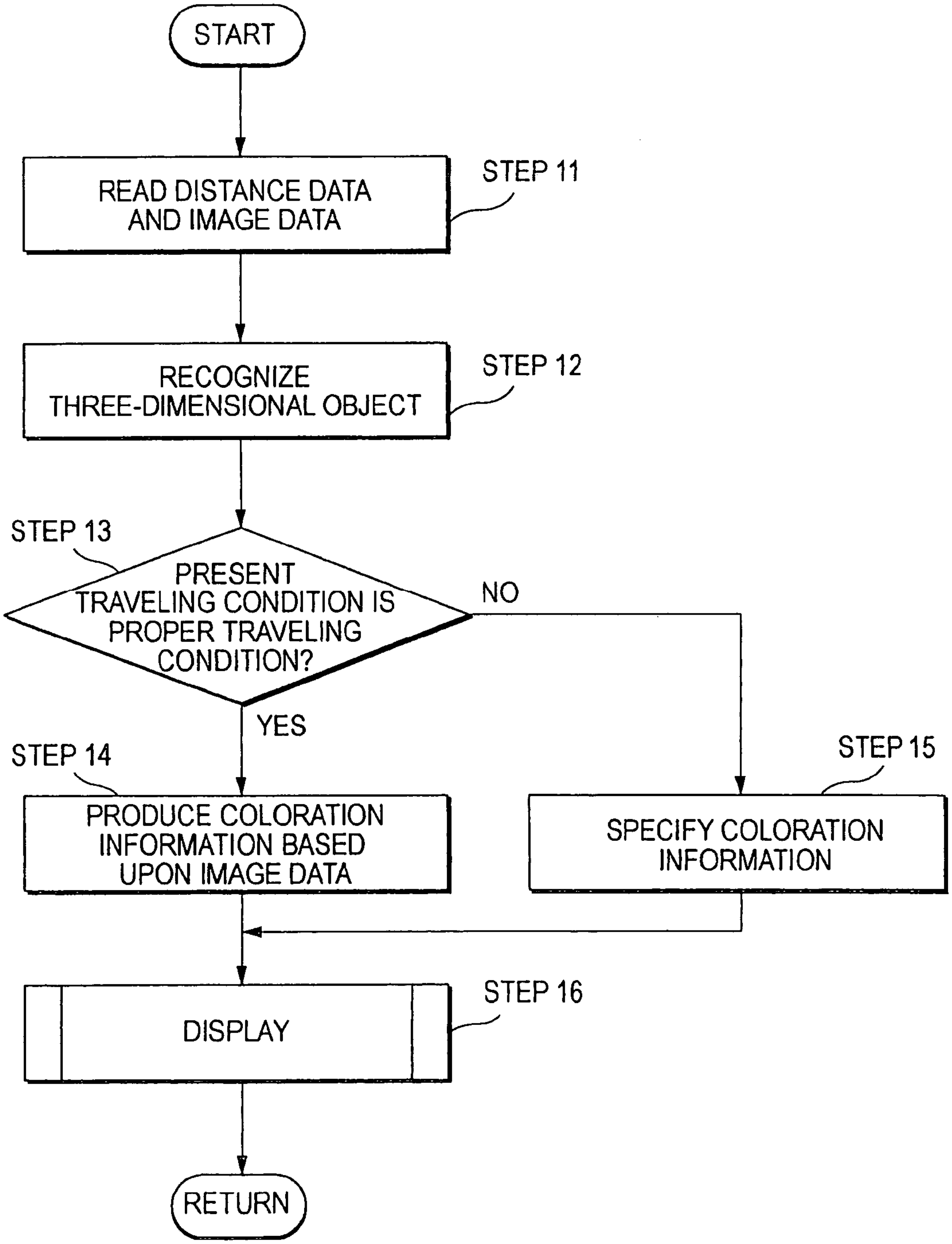
FIG. 7 is a flow chart for showing a sequence of an information display process according to the third embodiment.

FIG. 7 is a flow chart for describing a sequence of an information display process according to the third embodiment. A routine indicated in this flow chart is called every time a preselected time interval has passed, and then, the called routine is executed by the microcomputer 111. In a step 11, both a distance data and an image data (for example, reference image data) are read. In the third embodiment in which three primary color images are outputted from each of the main camera 102 and the sub-camera 103, three pieces of image data (will be referred to as "primary color image data" hereinafter) corresponding to each of the primary color images are read respectively.

In a step 12, three-dimensional objects are recognized which are located in front of the own vehicle. When the three-dimensional objects are recognized, first of all, noise contained in the distance data is removed by a group filtering process. In other words, parallaxes "Ni" which may be considered as low reliability are removed. A parallax "Ni" which is caused by mismatching effects due to adverse influences such as noise is largely different from a value of a peripheral parallax "Ni", and owns such a characteristic that an area of a group having a value equivalent to this parallax "Ni" becomes relatively small. As a consequence, as to parallaxes "Ni" which are calculated as to the respective pixel blocks, change amounts with respect to parallaxes "Ni" in pixel blocks which are located adjacent to each other along upper/lower directions, and right/left directions, which are present within a predetermined threshold value, are grouped. Then, dimension of areas of groups are detected, and such a group having a larger area than a predetermined dimension (for example, 2 pixel blocks) is judged as an effective group. On the other hand, parallaxes "Ni" belonging to such a group having an area smaller than, or equal to the predetermined dimension is removed from the distance data, since it is so judged that reliability of the calculated parallaxes "Ni" is low.

Next, based upon both the parallax "Ni" extracted by the group filtering process and the coordinate position on the image plane, which corresponds to this extracted parallax "Ni", a position on a real space is calculated by employing the coordinate transforming formula which is well known in this field. Then, since the calculated position on the real space is compared with the position of the road plane, such a parallax "Ni" located above the road plane is extracted. In other words, a parallax "Ni" equivalent to a three-dimensional object (will be referred to as "three-dimensional object parallax" hereinafter) is extracted. A position on the road surface may be specified by calculating a road model which defines a road shape. The road model is expressed by linear equations both in the horizontal direction and the vertical direction in the coordinate system of the real space, and is calculated by setting a parameter of this linear equation to such a value which is made coincident with the actual road shape. The recognizing unit 112 refers to the image data based upon such an acquired knowledge that a white lane line drawn on a road surface owns a high luminance value as compared with that of the road surface. Positions of right-sided white lane line and left-sided white lane line may be specified by evaluating a luminance change along a width direction of the road based upon this image data. In the case that a position of a white lane line is specified, changes in luminance values may be evaluated as to each of the three primary color image data. Alternatively, for instance, a change in luminance values as to specific primary color image data such as only a red image, or only both a red image and a blue image may be evaluated. Then, a position of a white lane line on the real space is detected by employing distance data based upon the position of this white lane line on the image plane. The road model is calculated so that the white lane lines on the road are subdivided into a plurality of sections along the distance direction, the right-sided white lane line and the left-sided white lane line in each of the sub-divided sections are approximated by three-dimensional straight lines, and then, these three-dimensional straight ines are coupled to each other in a folded line shape.

Next, the distance data is segmented in a lattice shape, and a histogram related to three-dimensional object parallaxes "Ni" belonging to each of these sections is formed every section of this lattice shape. This histogram represents a distribution of frequencies of the three-dimensional parallaxes "Ni" contained per unit section. In this histogram, a frequency of a parallax "Ni" indicative of a certain three-dimensional object becomes high. As a result, in the formed histogram, since such a three-dimensional object parallax "Ni" whose frequency becomes larger than, or equal to a judgment value is detected, this detected three-dimensional object parallel "Ni" is detected as a candidate of such a three-dimensional object which is located in front of the own vehicle. In this case, a distance defined up to the candidate of the three-dimensional object is also calculated. Next, in the adjoining sections, candidates of three-dimensional objects, the calculated distances of which are in proximity to each other, are grouped, and then, each of these groups is recognized as a three-dimensional object. As to the recognized three-dimensional object, positions of right/left edge portions, a central position, a distance, and the like are defined as parameters in correspondence therewith. It should be noted that the concrete processing sequence in the group filter and the concrete processing sequence of the three-dimensional object recognition are disclosed in the above-mentioned Japanese Laid-open patent Application No. Hei-10-285582, which may be taken into account, if necessary.

In a step 13, the control unit 113 judges as to whether or not the present traveling condition corresponds to such a condition that color information of the three-dimensional objects is suitably produced. As will be explained later, the color information of the three-dimensional objects is produced based upon luminance values of the respective primary color image data. It should be understood that color information which has been produced by employing primary color image data as a base under the normal traveling condition can represent an actual color of a three-dimensional object in high precision. However, in a case that the own vehicle is traveled through a tunnel, color information of a three-dimensional object which is produced based upon an image base is different from actual color information of this three-dimensional object, because illumination and illuminance within the tunnel are lowered.

As a consequence, in order to avoid that color information is erroneously produced, a judging process of the step 13 is provided before a recognizing process of a step 14 is carried out. A judgment as to whether or not the own vehicle is traveled through the tunnel may be made by checking that the luminance characteristics of the respective primary color image data which are outputted in the time sequential manner are shifted to the low luminance region, and/or checking a turn-ON condition of a headlight. Since such an event that a lamp of a headlight is brought into malfunction may probably occur, a status of an operation switch of this headlight may be alternatively detected instead of a turn-ON status of the headlight.

In the case that the judgment result of the step 13 becomes "YES", namely, the present traveling condition corresponds to the suitable traveling condition for producing the color information, the process is advanced to the step 14. In this step 14, color information is produced while each of the recognized three-dimensional objects is employed as a processing subject. In this process for producing the color information, first of all, a position group (namely, a set of (i, j)) on an image plane which is defined in correspondence with the three-dimensional parallax "Ni" corresponding to a group which is recognized as a three-dimensional object within a two-dimensional plane (ij plane) defined by distance data. Next, in each of the primary color image data, a luminance value of this defined position group is detected. In this embodiment with employment of three sets of the above-explained primary color image data, a luminance value (will be referred to as "R luminance value" hereinafter) of a position group in a red image is detected; a luminance value (will be referred to as "G luminance value" hereinafter) of a position group in green image is detected; and a luminance value (will be referred to as "B luminance value" hereinafter) of a position group in a blue image is detected. Then, in order to specify a featured color of this three-dimensional object, either a most frequent luminance value or an averaged luminance value of the position group is recognized as the color information of this three-dimensional object based upon the luminance value (correctly speaking, set of luminance value corresponding to position group) detected in each of the primary color image data. Accordingly, in this embodiment, the color information of the three-dimensional object becomes a set of the three color components made of the R luminance value, the G luminance value, and the B luminance value. For instance, in the case that a body color of a preceding-traveled vehicle is white, or a wear color of a pedestrian is white, color information of this preceding-traveled vehicle, or the pedestrian may be produced as R luminance value="255"; G luminance value="255"; and B luminance value="255."

On the other hand, in the case that the judgment result of this step 13 becomes "NO", namely, the present traveling condition corresponds to such an improper traveling condition for producing the color information, the process is advanced to a step 15. In this case, color information of three-dimensional objects is specified based upon the color information of the three-dimensional objects which have been produced under the proper traveling condition, namely, the color information which has been produced in the preceding time (step 15). First, the control unit 113 judges as to whether or not such three-dimensional objects which are presently recognized have been recognized in a cycle executed in the previous time. Concretely speaking, a three-dimensional object is sequentially selected from the three-dimensional objects which are presently recognized, and then, the selected three-dimensional object is positionally compared with the three-dimensional object which has been recognized before a predetermined time. Normally speaking, even when a traveling condition is time-sequentially changed, there is a small possibility that a move amount along a vehicle width direction and a move amount along a vehicle height direction as to the same three-dimensional object are largely changed. As a consequence, since such a judging operation is carried out as to whether or not a move amount of the three-dimensional object along the vehicle width direction (furthermore, move amount thereof to vehicle height direction) is smaller than, or equal to a predetermined judgment value, it can be judged as to whether or not the presently recognized three-dimensional object corresponds to such a three-dimensional object which has been recognized within the cycle executed in the previous time (namely, judgment as to identity of three-dimensional objects recognized in different times).

In this judging operation, as to no three-dimensional object identical to the three-dimensional object recognized before the predetermined time, namely, such a three-dimensional object which is newly recognized in this cycle, color information thereof is specified as "not recognizable." On the other hand, as to such a three-dimensional object which has been continuously recognized from the previous cycle, the color information which has already been produced is specified as color information thereof. In this case, as to such a three-dimensional object whose color information has been produced under the proper traveling condition, since the color information has already been produced in the process of the step 14, this produced color information is specified as the color information of this three-dimensional object. On the other hand, as to another three-dimensional object which has been recognized while this three-dimensional object is being traveled in a tunnel, since color information has not been produced in the previous cycle, this color information continuously remains under status of "not recognizable."

In a step 16, a display process is carried out based upon both the navigation information and the recognition result obtained by the recognizing unit 112. Concretely speaking, the control unit 113 controls the display device 115 so as to realize display modes described in the below-mentioned items (1) and (2):

(1) Both a symbol indicative of a three-dimensional object and a navigation information are displayed in a superimposing mode.

In a three-dimensional object recognizing operation using a distance data, a position indicative of the three-dimensional object is represented by a coordinate system (in this embodiment, three-dimensional coordinate system) in which the position of the own vehicle is set to a position of an origin thereof. Under such a circumstance, while the present position of the own vehicle acquired from the navigation system 114 is employed as a reference position, the control unit 113 superimposes a symbol indicative of the three-dimensional object on map data after this symbol has been set in correspondence with a position of a target in the real space based upon the position of the recognized target. In this case, while the control unit 113 refers to a road model, the control unit 113 defines a road position on the road data in correspondence with the positions of the three-dimensional objects by setting the road model, so that the symbols can be displayed on more correct positions.

(2) Symbols are displayed in predetermined display colors.

Symbols displayed on map data in the superimpose manner are represented by display colors corresponding to color information which has been produced/outputted as to targets thereof. In other words, a symbol representative of a three-dimensional object, to which red color information (for example, R luminance value: "255", G luminance value: "0", and B luminance value: "0") is represented by the same display color as this outputted red color information. Also, another symbol indicative of a three-dimensional object ("not recognizable") whose color information has not yet been produced/specified is displayed by employing a preset display color. This display color is preferably selected to be such a color which is different from the color information recognizable in the traffic environment, for example, a purple color may be employed.

Figure 8:
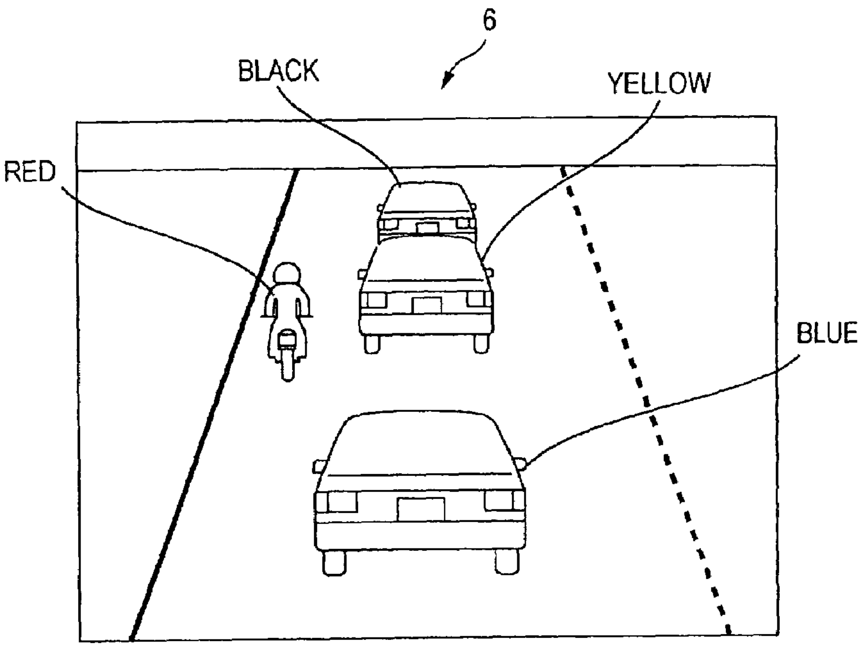
FIG. 8 is an explanatory diagram for showing a display condition of the display apparatus.
Figure 9:
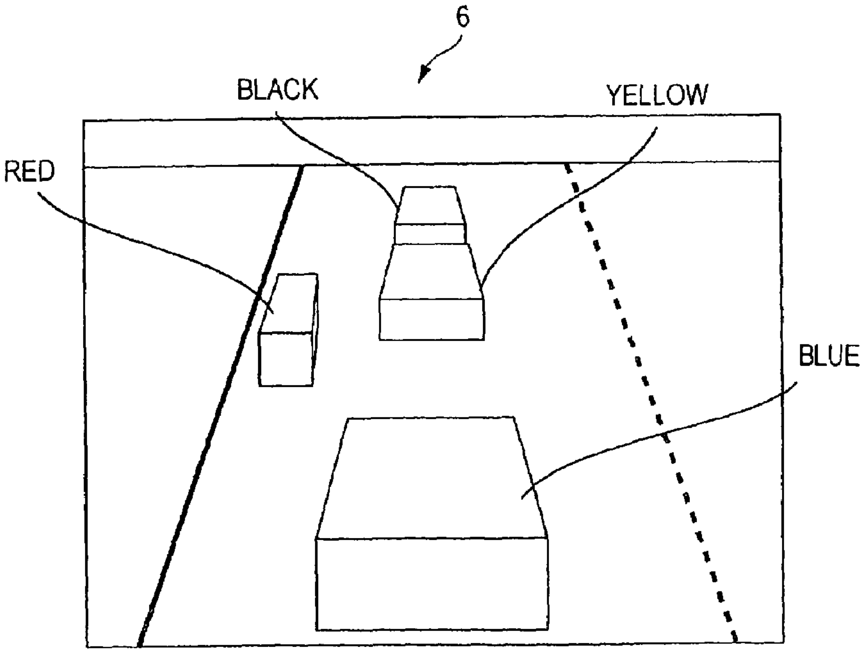
FIG. 9 is a schematic diagram for showing a display condition in front of the own vehicle.

FIG. 8 is an explanatory diagram for showing a display condition of the display device 115. FIG. 9 is a schematic diagram for showing an actual traveling condition, in which three-dimensional objects located in front of the own vehicle and colors (for example, body colors etc.) of these three-dimensional objects are indicated. In FIG. 8, in such a case that three automobiles are recognized, and only one two-wheeled vehicle is recognized (see FIG. 9), map data is displayed by employing a so-called "driver's eye" manner, and symbols indicative of the respective three-dimensional objects are displayed in such a case that these symbols are superimposed on this map data. In FIG. 8, as one example, while designs which simulate the three-dimensional objects are employed, the symbols indicative of these three-dimensional objects are represented by display colors corresponding to the color information of the recognized three-dimensional objects.

Also, the control unit 113 may alternatively control the display device 115 so that as represented in this drawing, the dimensions of the symbols to be shown are relatively different from each other in response to the dimensions of the recognized three-dimensional objects other than the above-explained conditions (1) and (2). Further, the control unit 113 may control the display device 115 in order that the symbols are represented by the perspective feelings. In this alternative case, the further a three-dimensional object is located far from the own vehicle, the smaller a display size of a symbol thereof is decreased in response to a distance from the recognized three-dimensional object to the own vehicle. Also, in such a case that a symbol which is displayed at a positionally far position is overlapped with another symbol which is displayed at a position closer than the above-described far position with respect to the own vehicle, the control unit 113 may alternatively control the display device 115 so that the former symbol is displayed on the side of the upper plane, as compared with the latter symbol. As a consequence, since the far-located symbol is covered to be masked by the near-located symbol, the visual recognizable characteristic of the symbols may be improved, and furthermore, the positional front/rear relationship between these symbols may be represented.

As previously explained, in accordance with this embodiment, a target (in this embodiment, three-dimensional object) which is located in front of the own vehicle is recognized based upon a color image and further, color information of this three-dimensional object is produced and then is outputted. Then, a symbol indicative of this recognized target and navigation information are displayed in the superimposing mode. In this case, the display device 115 is controlled so that the symbol to be displayed becomes such a display color corresponding to the color information outputted as to the target. As a result, the traveling condition which is actually recognized by the car driver may correspond to the symbols displayed on the display device 115 in the coloration, so that the colorative incongruity feelings occurred between the recognized traveling condition and the displayed symbols can be reduced. Also, since the display corresponds to the coloration of the actual traveling environment, the visual recognizable characteristic by the user (typically, car driver) can be improved. As a result, since the user convenient characteristic can be improved by the functions which are not realized in the prior art, the product attractive force can be improved in view of the user friendly aspect.

It should also be understood that when the symbols corresponding to all of the recognized three-dimensional objects are displayed, there is such a merit that the traveling conditions are displayed in detail. However, the amount of information displayed on the screen is increased. In other words, such an information as a preceding-traveled vehicle which is located far from the own vehicle is also displayed which has no direct relationship with the driving operation. In view of such an idea for eliminating unnecessary information, a plurality of three-dimensional objects which are located close to the own vehicle may be alternatively selected, and then, only symbols corresponding to these selected three-dimensional objects may be alternatively displayed.

Also, the third embodiment is not limited only such a symbol display operation that a symbol is displayed by employing a display color which is completely made coincident with a color component (namely, R luminance value, G luminance value, and B luminance value) of produced color information. In other words, this display color may be properly adjusted within a range which may expect that there is no visual difference among the users. Furthermore, the present invention may be applied not only to the display manner such as the driver's eye display manner, but also a bird's eye view display manner (for example, bird view) and a plan view display manner.

Also, since the stereoscopic camera is constituted by one pair of the main and sub-cameras which output the color images, the dual function can be realized, namely, the function as the camera which outputs the color image and the function as the sensor which outputs the distance data by the image processing system of the post stage thereof. The present invention is not limited to this embodiment. Alternatively, in addition to the above-described function, a similar function to that of the present embodiment may be achieved by combining a single-eye camera for outputting a color image with a well-known sensor such as a laser radar and a millimeter wave radar, capable of distance data. Also, if color information of three-dimensional objects located in front of the own vehicle is merely recognized and symbols are simply displayed by employing display colors corresponding to the color information of the recognized three-dimensional objects, then a sensor for outputting distance data is not always provided. In this alternative case, since the well-known image processing technique such as an optical flow, or a method for detecting a color component which is different from a road surface is employed, a three-dimensional object may be recognized from image data. It should also be understood that since distance data is employed, positional information of a three-dimensional object may be recognized in higher precision. As a consequence, since this positional information is reflected to a display process, a representation characteristic of an actual traveling condition on a display screen may be improved.

Also, in such a case that the recognizing unit 112 judges that a warning is required to a car driver based upon a recognition result of a target, this recognizing unit 112 may alternatively operate the display device 115 and the speaker 116 so that the recognizing unit 112 may give an attention to the car driver. Alternatively, the recognizing unit 112 may control the control device 117, if necessary, so as to perform a vehicle control operation such as a shift down operation and a braking control operation.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An information display apparatus comprising:

a preview sensor for detecting a traveling condition in front of own vehicle;

a navigation system for outputting a navigation information in response to a traveling operation of the own vehicle;

a recognizing unit for recognizing a plurality of targets located in front of the own vehicle based upon a detection result from said preview sensor, and for classifying said recognized targets by sorts to which said plural targets belong;

a control unit for determining information to be displayed based upon both the targets recognized by said recognizing unit and said navigation information; and a display device for displaying said determined information under control of said control unit, wherein said control unit controls said display device so that both symbols indicative of said recognized targets and said navigation information are displayed in a superimposing manner, and also, controls said display device so that said plural symbols are displayed by employing a plurality of different display colors corresponding to the sorts to which the respective targets belong.

2. An information display apparatus as claimed in claim 1, wherein said recognizing unit classifies said recognized target by at least any one of an automobile, a two-wheeled vehicle, a pedestrian, and an obstruction.

3. The information display apparatus according to claim 1, wherein the symbols have been stored in a memory.

4. An information display apparatus comprising:

a preview sensor for detecting a traveling condition in front of own vehicle;

a navigation system for outputting a navigation information in response to a traveling operation of the own vehicle;

a recognizing unit for recognizing a plurality of targets located in front of the own vehicle based upon a detection result from said preview sensor, and for calculating dangerous degrees of said recognized targets with respect to the own vehicle;

a control unit for determining information to be displayed based upon both the targets recognized by said recognizing unit and said navigation information; and a display device for displaying said determined information under control of said control unit, wherein said control unit controls said display device so that both symbols indicative of said recognized targets and said navigation information are displayed in a superimposing manner, and also, controls said display device so that said plural symbols are displayed by employing a plurality of different display colors corresponding to said dangerous degrees.

5. An information display apparatus as claimed in claim 4, wherein said display colors are set to three, or more different colors in response to said dangerous degrees.

6. The information display apparatus according to claim 4, wherein the symbols have been stored in a memory.

7. An information display method comprising:

a first step of recognizing a plurality of targets located in front of own vehicle based upon a detection result obtained by detecting a traveling condition in front of the own vehicle, and classifying said recognized targets by sorts to which said plural targets belong;

a second step of acquiring a navigation information in response to a traveling operation of the own vehicle; and a third step of determining information to be displayed based upon both the targets recognized by said first step and said navigation information acquired by said second step, and displaying said determined information, wherein said third step includes displaying both symbols indicative of said recognized targets and said navigation information in a superimposing manner, and displaying said plural symbols by employing a plurality of different display colors corresponding to the sorts to which the respective targets belong.

8. An information display method as claimed in claim 7, wherein said first step includes classifying said recognized target by at least any one of an automobile, a two-wheeled vehicle, a pedestrian, and an obstruction.

9. The information display method according to claim 7, wherein the symbols have been stored in a memory.

10. An information display method comprising:

a first step of recognizing a plurality of targets located in front of own vehicle based upon a detection result obtained by detecting a traveling condition in front of the own vehicle, and calculating dangerous degrees of said recognized targets with respect to the own vehicle;

a second step of acquiring a navigation information in response to a traveling operation of the own vehicle; and a third step of determining information to be displayed based upon both the targets recognized by said first step and said navigation information acquired by said second step, and displaying said determined information, wherein said third step includes displaying both symbols indicative of said recognized targets and said navigation information in a superimposing manner, and displaying said plural symbols by employing a plurality of different display colors corresponding to said dangerous degrees.

11. An information display method as claimed in claim 10, wherein said display colors are set to three, or more different colors in response to said dangerous degrees.

12. The information display method according to claim 10, wherein the symbols have been stored in a memory.

13. An information display apparatus comprising:

a camera for outputting a color image by photographing a scene in front of own vehicle;

a navigation system for outputting a navigation information in response to a traveling operation of the own vehicle;

a recognizing unit for recognizing a target located in front of said own vehicle based upon said outputted color image, and for outputting the color information of said recognized target;

a control unit for determining information to be displayed based upon both the targets recognized by said recognizing unit and said navigation information; and a display device for displaying said determined information under control of said control unit, wherein said control unit controls said display device so that a symbol indicative of said recognized target and said navigation information are displayed in a superimposing manner, and controls said display device so that said symbol is displayed by employing a display color which corresponds to the color information of said target.

14. An information display apparatus as claimed in claim 13, further comprising:

a sensor for outputting a distance data which represents a two-dimensional distribution of a distance in front of the own vehicle, wherein said recognizing unit recognizes a position of said target based upon said distance data; and said control unit controls said display device so that said symbol is displayed in correspondence with the position of said target in a real space based upon the position of said target recognized by said recognizing unit.

15. An information display apparatus as claimed in claim 14, wherein said camera comprises a first camera for outputting the color image by photographing the scene in front of the own vehicle, and a second camera which functions as a stereoscopic camera operated in conjunction with said first camera; and said sensor outputs said distance data by executing a stereoscopic matching operation based upon both the color image outputted from said first camera and the color image outputted from said second camera.

16. An information display apparatus as claimed in claim 13, wherein in the case that said recognizing unit judges such a traveling condition that the outputted color information of the target is different from an actual color of said target, said recognizing unit specifies the color information of said target based upon the color information of said target which has been outputted in the preceding time; and said control unit controls said display device so that said symbol is displayed by employing a display color corresponding to said specified color information.

17. An information display apparatus as claimed in claim 13, wherein said control unit controls said display device so that as to a target, the color information of which is not outputted from said recognizing unit, said symbol indicative of said target is displayed by employing a predetermined display color which has been previously set.

18. The information display apparatus according to claim 13, wherein the symbols have been stored in a memory.

19. An information display method comprising:

a first step of recognizing a target located in front of own vehicle based upon a color image acquired by photographing a scene in front of said own vehicle, and producing a color information of said recognized target;

a second step of acquiring a navigation information in response to a traveling operation of the own vehicle; and a third step of displaying a symbol indicative of said recognized target and said navigation information in a superimposing manner so that said symbol is displayed by employing a display color corresponding to said produced color information of said target.

20. An information display method as claimed in claim 19, further comprising:

a fourth step of recognizing a position of said target based upon a distance data indicative of a two-dimensional distribution of a distance in front of the own vehicle, wherein said third step is displaying the symbol in correspondence with a position of said target in a real space based upon the position of said recognized target.

21. An information display method as claimed in claim 19, wherein said first step includes a step of, when a judgment is made of such a traveling condition that said produced color information of the target is different from an actual color of said target, specifying a color information of said target based upon the color information of said target which has been outputted in the preceding time; and said third step includes a step of controlling said display device so that said symbol is displayed by employing a display color corresponding to said specified color information.

22. An information display method as claimed in claim 19, wherein said third step includes a step of controlling said display device so that with respect to a target whose color information is not produced, said symbol indicative of said target is displayed by employing a predetermined display color which has been previously set.

23. The information display method according to claim 19, wherein the symbols have been stored in a memory.

* * * * *